Patented July 14, 1936

2,047,926

UNITED STATES PATENT OFFICE 2,047,926

DI TETRAHYDRO FURFURYL AMINES AND PREPARATION THEREOF

Howard I. Cramer, Cuyahoga Falls, Ohio, assignor to Wingfoot Corporation, Wilmington, Del., a corporation of Delaware No Drawing. Application April 4, 1934, Serial No. 719,039

17 Claims. (Cl. 260—54)

This invention relates to certain new chemical compounds and to the process of their preparation.

Heretofore it has been observed that when hydrofuramide, or, as it is sometimes called, tri alpha furfurylidene diamine, is treated with hydrogen in the presence of an active catalyst, under superatmospheric pressures and at temperatures in the neighborhood of 80–100° C. two water-white liquids form; namely, tetrahydro alpha furfuryl amine, boiling at 150–152° C. at 735 mm. pressure, and di alpha furfuryl amine, boiling at 103–106° C. at 2–3 mm. pressure. Substantially quantitative yields of these two products may be obtained in from one to two hours.

This invention resides in the discovery that by hydrogenating di furfuryl amine, the compound di tetrahydro furfuryl amine is obtained. Because of the presence of small amounts of impurities in hydrofuramide which tend to poison the catalyst and prevent the further reduction of the intermediate product, di furfuryl amine, it is desirable to segregate the original products of the hydrogenation of hydrofuramide and afterwards hydrogenate di furfuryl amine in an additional step.

If di furfuryl amine is segregated from the original hydrogenation products of hydrofuramide and then hydrogenated separately, it may be efficiently converted to di tetrahydro furfuryl amine by subjecting it to a hydrogen pressure upwards of 20 atmospheres, preferably in the neighborhood of 125 atmospheres, and to a temperature upwards of 85° C. in the presence of a hydrogenation catalyst. Much higher pressures, for example in the neighborhood of 400 atmospheres, may be employed, their use depending somewhat on the strength of the apparatus. Generally there is little, if any, reduction of the di furfuryl amine at a temperature below 120° C. At temperatures in the neighborhood of 140–150° C., the rate of reduction is rapid.

Although any hydrogenation catalyst is applicable for the purpose of this invention, it has been found that a supported nickel catalyst prepared according to the process outlined more fully in the patent application of Homer Adkins, Serial No. 616,093, filed June 8, 1932, gives excellent results. This catalyst is prepared by mixing an aqueous solution of a nickel salt and a foraminous carrier, preferably acid-washed kieselguhr, and thereafter grinding the carrier-nickel salt mixture until it is of a cream-like consistency. Following this, a carbonate precipitant which reacts basic to litmus paper, preferably an aqueous solution of an ammonium or alkali metal carbonate such as ammonium carbonate, sodium carbonate or sodium bicarbonate, is added to the mixture. After washing and drying, the resulting precipitated nickel carbonate is reduced in a stream of hydrogen or other reducing gas for approximately 60 to 80 minutes at 425–475° C., the finished catalyst containing 14–15% nickel. Other catalysts prepared in a similar manner may be used with excellent results, examples being those of copper and cobalt.

Platinum and other noble metal catalysts may be employed with excellent results, but because of the lower cost of the base metal hydrogenation catalysts, the latter will generally be found more desirable.

Nickel catalysts prepared by methods such as the following may be used to advantage: (1) the reduction of any nickel salt, either supported or unsupported, by hydrogen or other reducing agent; (2) the treatment of a nickel alloy such as nickel-aluminum or nickel-silicon with aqueous alkalis, particularly as described in United States Patent No. 1,628,190 to Murray Raney; (3) the reduction of nickel salts in admixture with salts of other metals of Groups VIII or I of Mendelejeff's Periodic Table, the reduced salts acting as co-catalysts; (4) the reduction of nickel salts mixed with promoters such as oxides of the metals of Groups II, III, IV, V, and VI of Mendelejeff's Periodic Table; (5) mechanical subdivision of massive nickel; (6) anodic oxidation of nickel surfaces followed by reduction; (7) colloidal dispersion of metallic nickel; (8) precipitation by more electropositive metals such as aluminum and zinc.

In the hydrogenation of hydrofuramide, the compounds mono alpha furfuryl amine and di alpha furfuryl amine are first obtained but, since mono alpha furfuryl amine is very easily reduced, it is converted almost instantly to mono tetrahydro alpha furfuryl amine. The reduction of the di alpha furfuryl amine is much more difficult, and it should be segregated and separately reduced. The equations representing the various reactions are believed to be as follows:

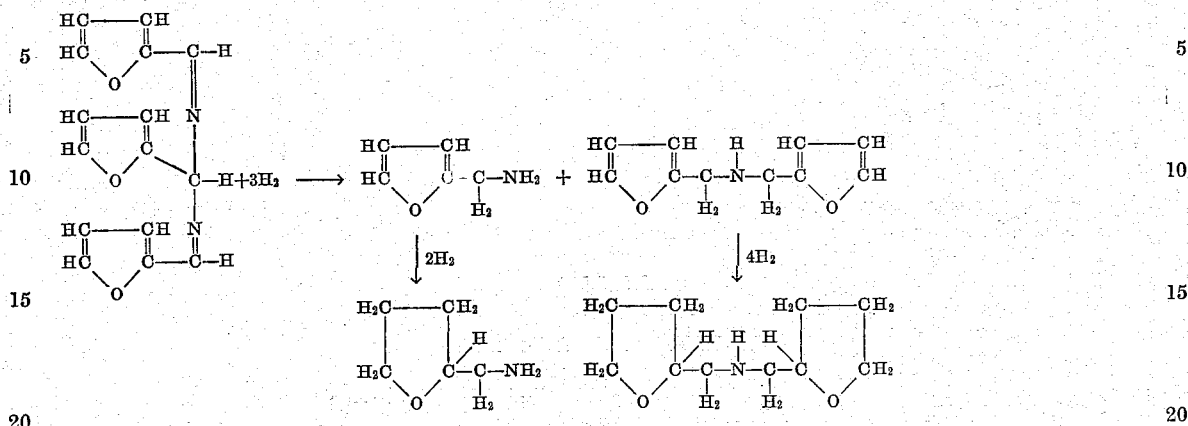

The following examples are illustrative of the practice of the invention.

*Example 1*

Approximately 250 grams of di alpha furfuryl amine, boiling point 110–115° C. at a pressure of 4–5 mm., prepared by treating an alcoholic solution of hydrofuramide with hydrogen in the presence of a reduced nickel catalyst under a pressure of approximately 125 atmospheres and at a temperature in the neighborhood of 100° C., and 15 grams of a reduced nickel catalyst supported on kieselguhr, prepared as described in Adkins application Serial No. 616,093, filed June 8, 1932, are placed in a suitable hydrogenation bomb equipped so as to permit continuous agitation of its contents during the reaction. Hydrogen is admitted under an initial pressure of approximately 125 atmospheres.

The bomb is then heated, the temperature being brought up to about 115° C. during the first half hour, during which time little or no hydrogen absorption occurs. Thereupon the temperature rises to 130° C. almost at once, indicating that hydrogenation has begun, and the external heat supply is cut off. The absorption of hydrogen soon becomes very rapid, the temperature rising to about 150° C. within the space of a few minutes and remaining in the neighborhood of 150° C. for approximately 80 minutes. The reaction is then terminated, as the absorption of hydrogen by this time has practically stopped.

The equation representing the reaction is believed to be as follows:

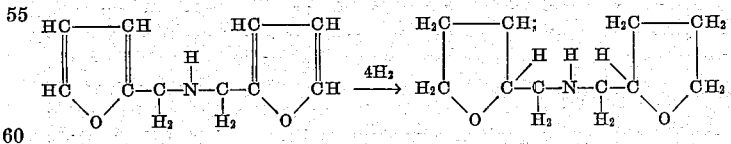

Three other portions of di alpha furfuryl amine were hydrogenated similarly and the products of all four runs, after being washed with ether to remove the catalyst, were combined, and fractionally distilled. The following fractions were obtained:

1—boiling up to 50° C. under pressure of a water pump—ether washings.
2—boiling between 50 and 105° C. at 1–2 mm.—10.0 grams.
3—boiling between 105 and 110° C. at 1–3 mm.—802.1 grams.
4—residue—22 grams.

Of these fractions, Fraction #3 was identified as di tetrahydro alpha furfuryl amine. It is probable that the major portion of Fractions #2 and #4 was also di tetrahydro furfuryl amine. In identifying fraction #3 as di tetrahydro alpha furfuryl amine, a number of tests were made. First, a specific gravity test of Fraction #3 gave figures of 1.0334 at 15° C. and 1.0392 at 20° C. Next, a 2 gram portion of Fraction #3 upon being mixed with 5 grams of picric acid in 15 cc. of 2—B alcohol gave a solution from which a viscous oil formed on chilling. The mixture upon standing overnight formed no crystals. The flask containing the mixture was then placed in a freezing mixture, after which the alcohol layer was decanted from the oily layer and the latter stirred in the cold. In five minutes a yellow solid, melting at 90–95° C., formed. This solid, upon being recrystallized from water, melted at 99–100° C. Upon being further purified by recrystallization from benzene and methyl alcohol, crystals melting at 102–103° C. and identified as di tetrahydro alpha furfuryl amine picrate were obtained. Still further, a nitrogen determination of Fraction #3 showed an average nitrogen content of 13.20% as compared with the theoretical nitrogen content of 13.44% for di tetrahydro alpha furfuryl amine.

*Example 2*

Di alpha furfuryl amine in the amount of 92 grams was hydrogenated under an initial pressure of approximately 125 atmospheres of hydrogen in the presence of 3 grams of a reduced nickel catalyst supported on kieselguhr. At 120° C., hydrogen absorption was first observed. At 140° C., the absorption became so rapid that the temperature of the reaction mixture rose to 198° C. in 5 minutes because of the heat evolved in the reaction. The temperature of the mixture was then permitted to fall to 150° C., whereupon the experiment was stopped. The product after being washed with ether to remove the catalyst and filtered was fractionally distilled, the following fractions being obtained:

1—up to 119° C. at 7.5 mm.—ether washings.
2—119–120° C. at 7.5 mm.—89.2 grams of di tetrahydro alpha furfuryl amine.
3—above 120° C. at 7.5 mm.—1.7 grams of vapors condensed from fractionating column.

Fraction #2 was a water white liquid of characteristic odor and gave a picrate from alcohol melting at 104–105° C. The picrate, upon being analyzed by precipitating picric acid as nitron picrate and weighing, gave a picric acid analysis of 55.37% as compared with the theoretical content of 55.32% for di tetrahydro furfuryl amine picrate.

The examples hereinbefore set forth are to be understood as illustrative only and not as limitative of the scope of the invention. For example, other hydrogenation catalysts than those indicated in the examples may be employed. While the invention has been described in detail in connection with its application to the alpha furfuryl amines, it is to be understood that the beta furfuryl amines may be prepared similarly by starting with the beta furfuraldehyde in preparing the hydrofuramide rather than with the more readily available alpha furfuraldehyde, commonly called furfural. It is intended that the patent shall cover, by suitable expression in the appended claims, whatever feautres of patentable novelty reside in the invention.

What I claim is:

1. The process of preparing di tetrahydro furfuryl amine which comprises hydrogenating di furfuryl amine at superatmospheric pressure, at a temperature upwards of 85° C. but below the temperature at which di furfuryl amine decomposes, and in the presence of a hydrogenation catalyst.

2. The process of preparing di tethahydro furfuryl amine which comprises hydrogenating di furfuryl amine at a pressure of from 20 to 400 atmospheres, at a temperature ranging from approximately 85 to approximately 200° C., and in the presence of a hydrogenation catalyst.

3. The process of preparing di tetrahydro furfuryl amine which comprises hydrogenating di furfuryl amine at superatmospheric pressure, at a temperature upwards of 85° C. but below the temperature at which di furfuryl amine decomposes, and in the presence of a base metal hydrogenation catalyst.

4. The process of preparing di tetrahydro furfuryl amine which comprises hydrogenating di furfuryl amine at superatmospheric pressure, at a temperature upwards of 85° C. but below the temperature at which di furfuryl amine decomposes, and in the presence of a nickel catalyst.

5. The process of preparing di tetrahydro furfuryl amine which comprises hydrogenating di furfuryl amine at superatmospheric pressure, at a temperature upwards of 85° C. but below the temperature at which di furfuryl amine decomposes, and in the presence of a reduced nickel catalyst.

6. The process of preparing di tetrahydro furfuryl amine which comprises hydrogenating di furfuryl amine at superatmospheric pressure, at a temperature upwards of 120° C. but below the temperature at which di furfuryl amine decomposes, and in the presence of a reduced nickel catalyst supported on kieselguhr.

7. The process of preparing di tetrahydro furfuryl amine which comprises hydrogenating di furfuryl amine at superatmospheric pressure, at a temperature upwards of 120° C. but below the temperature at which di furfuryl amine decomposes, and in the presence of a supported nickel catalyst.

8. The process of preparing di tertahydro furfuryl amine which comprises hydrogenating di furfuryl amine at a pressure of from 20 to 400 atmospheres, at a temperature ranging from approximately 85 to approximately 200° C., and in the presence of a base metal hydrogenation catalyst.

9. The process of preparing di tetrahydro furfuryl amine which comprises hydrogenating di furfuryl amine at a pressure of from 20 to 200 atmospheres, at a temperature ranging from approximately 85 to approximately 200° C., and in the presence of a nickel catalyst.

10. The process of preparing di tetrahydro furfuryl amine which comprises hydrogenating di furfuryl amine at a pressure of from 20 to 200 atmospheres, at a temperature ranging from approximately 120 to approximately 200° C., and in the presence of a reduced nickel catalyst.

11. The process of preparing di tetrahydro furfuryl amine which comprises hydrogenating di furfuryl amine at a pressure of from 20 to 200 atmospheres, at a temperature ranging from approximately 120 to 200° C., and in the presence of a reduced nickel catalyst supported on kieselguhr.

12. The process of preparing di tetrahydro furfuryl amine which comprises hydrogenating di furfuryl amine at a pressure of from 20 to 200 atmospheres, at a temperature ranging from approximately 120 to approximately 200° C., and in the presence of a supported nickel catalyst.

13. The process of preparing di tetrahydro alpha furfuryl amine which comprises treating di alpha furfuryl amine with hydrogen at an initial pressure in the neighborhood of 125 atmospheres, at a temperature in the neighborhood of 140–150° C. and in the presence of a hydrogenation catalyst.

14. The process of preparing di tetrahydro alpha furfuryl amine which comprises treating di alpha furfuryl amine with hydrogen at an initial pressure in the neighborhood of 125 atmospheres, at a temperature in the neighborhood of 150° C. and in the presence of a supported nickel catalyst.

15. The process of preparing di tetrahydro furfuryl amine which comprises treating hydrofuramide with hydrogen under reducing conditions, segregating from the resulting product di furfuryl amine, and hydrogenating the di furfuryl amine under superatmospheric pressure, in the presence of a hydrogenation catalyst and at a temperature upwards of 120° C. but below the temperature at which di furfuryl amine decomposes.

16. As a new compound, di tetrahydro furfuryl amine.

17. As a new compound, di tetrahydro alpha furfuryl amine.

HOWARD I. CRAMER.